(12) United States Patent
Oehler et al.

(10) Patent No.: US 9,538,587 B2
(45) Date of Patent: Jan. 3, 2017

(54) METHOD AND DEVICE FOR CLOSED-LOOP CONTROL OF THE ELECTRODE GAP IN A VACUUM ARC FURNACE

(75) Inventors: Ralf Oehler, Darmstadt (DE); Harald Scholz, Rodenbach (DE); Frank-Werner Hoffmann, Büdingen (DE)

(73) Assignee: ALD VACUUM TECHNOLOGIES GMBH, Hanau (DE)

(*) Notice: Subject to any disclaimer, the term of this patent is extended or adjusted under 35 U.S.C. 154(b) by 927 days.

(21) Appl. No.: 13/880,545

(22) PCT Filed: Oct. 6, 2011

(86) PCT No.: PCT/EP2011/067483
§ 371 (c)(1),
(2), (4) Date: Jul. 2, 2013

(87) PCT Pub. No.: WO2012/052302
PCT Pub. Date: Apr. 26, 2012

(65) Prior Publication Data
US 2013/0279535 A1 Oct. 24, 2013

(30) Foreign Application Priority Data
Oct. 21, 2010 (DE) .......... 10 2010 042 782

(51) Int. Cl.
H05B 3/60 (2006.01)
H05B 7/148 (2006.01)
H05B 7/152 (2006.01)

(52) U.S. Cl.
CPC .............. *H05B 7/152* (2013.01); *H05B 7/148* (2013.01); *Y02P 10/256* (2015.11); *Y02P 10/259* (2015.11)

(58) Field of Classification Search
CPC .......... H05B 7/148; H05B 7/152; H05B 7/144; F27B 3/085; F27B 3/28; F27D 11/08; Y02P 10/256; Y02P 10/259
(Continued)

(56) References Cited

U.S. PATENT DOCUMENTS 4,303,797 A * 12/1981 Roberts .................... H05B 3/00
                                                    373/52
4,578,795 A    3/1986  Fisher et al.
(Continued)

FOREIGN PATENT DOCUMENTS

| JP | S63502785 A | 10/1988 |
| JP | H0254892 A | 2/1990 |
| JP | H0869877 A | 3/1996 |

OTHER PUBLICATIONS

English Translation of the International Preliminary Report on Patentability, Application No. PCT/EP2011/067483, May 2, 2013, 8 pages.
(Continued)

*Primary Examiner* — Hung D Nguyen
(74) *Attorney, Agent, or Firm* — Quarles & Brady LLP

(57) ABSTRACT

A method and a device for closed-loop control of an electrode gap in a vacuum arc furnace subjects an electrode gap of a melting electrode from the surface of a melt material to closed-loop control as a function of a droplet short-circuit rate. For this purpose, a histogram of detected droplet short-circuits is created on the basis of at least one droplet short-circuit criterion. The histogram is subdivided into sub-areas, a characteristic sub-area of the histogram is selected for closed-loop control purposes. The electrode gap is subjected to closed-loop control on the basis of the droplet short-circuits which can be associated with the selected sub-area.

14 Claims, 8 Drawing Sheets

(58) Field of Classification Search
USPC ........ 373/42, 46, 47, 49, 50, 60, 67, 68, 70,
77,373/102, 104, 105, 52, 94, 54
See application file for complete search history.

(56) References Cited

U.S. PATENT DOCUMENTS

| | | | | |
|---|---|---|---|---|
| 4,797,897 | A | * | 1/1989 | Stenzel .................. H05B 7/152 |
| | | | | 373/105 |
| 4,881,239 | A | | 11/1989 | Stenzel et al. |
| 5,621,751 | A | * | 4/1997 | Williamson ............ F27B 3/085 |
| | | | | 373/104 |
| 5,708,667 | A | | 1/1998 | Hayashi |
| 5,930,284 | A | | 7/1999 | Hysinger et al. |
| 6,019,811 | A | * | 2/2000 | Schlienger ................ C22B 9/18 |
| | | | | 75/10.12 |
| 6,115,404 | A | | 9/2000 | Bertram et al. |
| 8,077,754 | B1 | * | 12/2011 | Williamson ............ F27B 3/085 |
| | | | | 373/102 |

OTHER PUBLICATIONS

International Search Report as mailed on Feb. 8, 2012 for International Application No. PCT/EP2011/067483.

\* cited by examiner

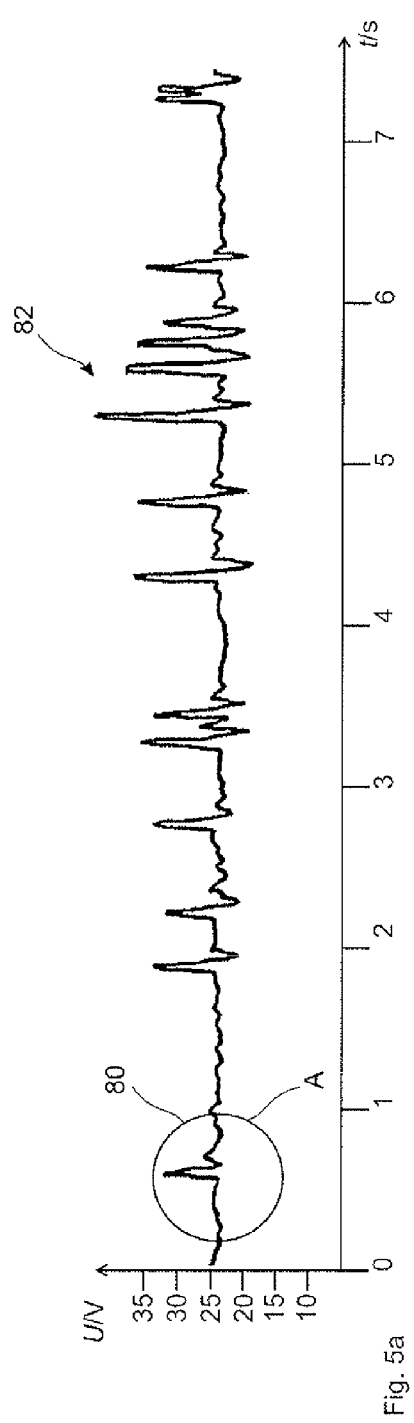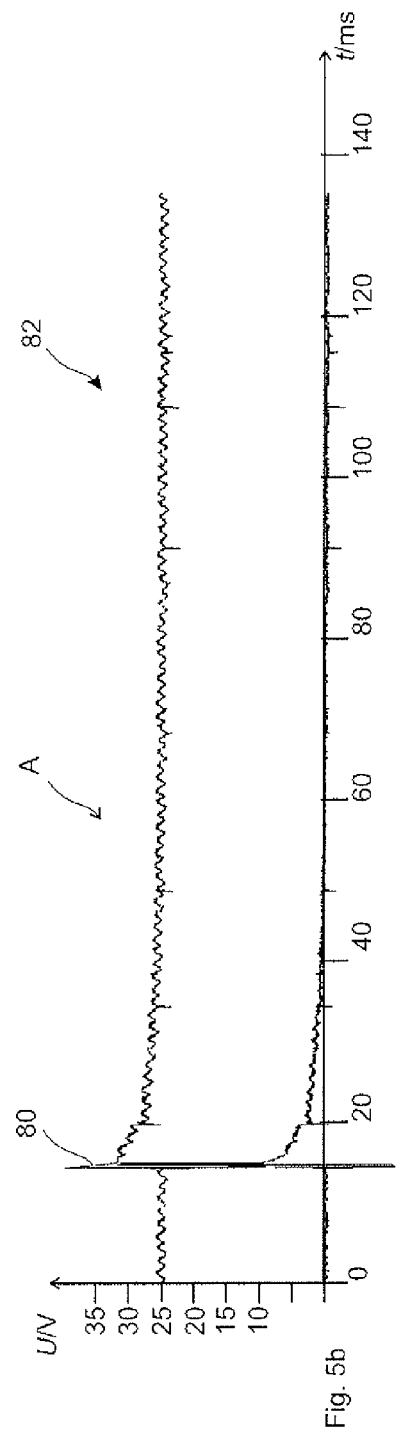

METHOD AND DEVICE FOR CLOSED-LOOP CONTROL OF THE ELECTRODE GAP IN A VACUUM ARC FURNACE

CROSS-REFERENCE TO RELATED APPLICATIONS

This application represents the national stage entry of PCT International Application No. PCT/EP2011/067483 on Oct. 6, 2011 and claims the benefit of German Patent Application No. 10 2010 042 782.9 filed Oct. 21, 2010. The contents of both of these applications are hereby incorporated by reference as if set forth in their entirety herein.

The present invention relates to a method and device for closed-loop control of the electrode gap in a vacuum arc furnace, wherein an electrode gap of a melting electrode from the surface of a melt material is subjected to closed-loop control as a function of a droplet short-circuit rate.

Vacuum arc melting is a secondary melting process for producing high-quality metal blanks with improved chemical and mechanical properties of the remelt material. The vacuum arc remelting process is in particular used for producing materials for aircraft construction as well as for fields of application related with space travel and biomedical sciences.

In a vacuum arc melting furnace, an electrode extends toward a crucible and is melted off in a vacuum or low pressure atmosphere by applying an electrical voltage between the electrode and the crucible, wherein the liquid material cumulates at the crucible bottom. Such an arc melting furnace is in particular used for melting so-called refractory active elements such as titanium or zircon as well as for producing stainless steels and high-temperature alloys. The voltages applied here usually range between 10 to 30 Volts, wherein several thousand Amperes of direct or alternating current flow in order to maintain a continuous melting process. Normally, the crucible is cooled by means of a water isolation in order to control the melt-off rate. In the course of the melting process, the electrode has to be guided downward relative to the melt material in order to maintain a homogeneous melt gap between the melt material surface and the melting electrode. Since no direct gap measuring is possible due to the process circumstances, several methods are known to determine the electrode gap indirectly and to subject it to closed-loop control.

From the state of the art, it is known to determine the frequency of occurrence of short-circuits within a particular area and to maintain the number of short-circuits at a constant level by means of closed-loop control of the gap. The frequency of occurrence of the occurring short-circuits is equalized with the electrode gap. By means of an improved closed-loop control of the gap, occurring material impurities, in particular so-called "white spots", can be reduced. These are mixed crystal areas which, during hardening, become depleted of alloy elements such as niobium or titanium, but are supplemented with other materials such as nickel. They take the form of dendrites in the central cavity of the electrode or the form of shelf during remelting at the crucible wall due to the accumulation conditions, and can fall down into the molten pool during remelting, wherein there, they do not melt off anymore. They can reach the prefabricated component and can affect the security and durability of the components negatively. For avoiding such "white spots", a regular and uninterrupted closed-loop control of the gap of the electrode from the crucible melting surface can be maintained which, in connection with the crucible cooling, improves the quality of the melt material.

In this way, a decrease of a so-called "lip", that is the formation of a toroid at the tip of the electrode, and the development of so-called two-phase areas of potential accumulation white spots and potential dendritic white spots can be reduced, and the size of the shrinkage crack of the accumulation material in the crucible can be monitored. An improved closed-loop control of the gap thus leads to a higher quality of the remelt material.

From the document DE 3544005 C, a method for controlling the gap between the melt electrode in a vacuum arc furnace is known, with which the frequency of occurrence of the short-circuits generated by droplets between the melt electrode and the surface of the molten mass is used as a control criterion. A controller is used which compares a drop frequency set value to a drop frequency actual value, wherein the actual value is determined in a preset time interval by determining the drop rate. The method is applied throughout the entire remelting process, wherein only a particular, broadly defined type of drops is taken into account.

In existing methods for closed-loop control of the gap, the droplet short-circuit trigger threshold >4 V, in particular >8 V, and drop lengths of 0.1 ms to 200 ms are recorded by means of a simple Schmitt trigger, and almost all measured short-circuits are used for the closed-loop control of the gap. However, empirical studies show that in different phases of the remelting process, different types of droplets appear dominantly, wherein, depending on the remelting phase and the remelting conditions, some of the occurring droplet short-circuits are better suited for closed-loop control of the electrode gap than others. The methods known from the state of the art, however, do not take into account any differing types of droplet short-circuits and do not, for instance, distinguish between particular types of droplet short-circuits. If, for instance, with electrodes with particular diameters or with particular alloys, only a few or only unusable droplet short-circuits occur, the method known from the state of the art is useless. Usually, voltage drops in the range from 4 to 10 Volts and longer are examined as 100 μs. However, it has shown that, with particular electrode diameters or with particular alloys, often only droplet short-circuits in the range <0.1 ms occur or voltage drops of the direct current voltage of <8 Volt or >1 Volt occur, wherein these two are usually not examined for closed-loop control purposes. In particular with high currents, large droplets occur only rarely, such that in these cases, a closed-loop control on the basis of conventional measurement ranges is disadvantageous. On the basis of the closed-loop control techniques used so far, the detection of droplet short-circuits beyond the conventional measurement range, in particular of small droplets, which is realized by means of a voltage and current measurement, could only be performed in an imprecise manner during the remelting process due to the difficult conditions from the electrical point of view, since, on the one hand, the used sensors were not sensitive enough, and on the other hand, the electricity network supplies a melting voltage which is heavily susceptible to failures, such that a systematic recording of small droplets, in particular with a heterogeneous electrical power network with many high-current consumers surrounding the remelting furnace, was made difficult.

With fluctuating or too small or to large gaps between the electrode and the surface of the melt material, the remelting process is unsteady, wherein deteriorations of the quality of the remelt material occur, such as an inhomogeneous block surface, an increased number of impurity inclusions, a fluctuating melting rate and an increased number of "white spots". If the gap between the electrode and the surface of the melt material is too large, the arc melts the base of the side crown, which tends to tilt into the molten pool when losing its base stability. Furthermore, the lip of the electrode grows or decreases with a fluctuating arc gap, such that increases may arise and uncontrolled oscillating movements with resulting solidification errors are the result. In this way, an increased loss of alloy elements can also occur.

Thus, it is one task of the invention to provide an improved method for closed-loop control and a device for closed-loop control which makes a high-precision closed-loop control of the gap of the electrode in a vacuum arc furnace possible, such that an improved quality of the remelt material can be achieved.

This task is solved by a method and device according to the teachings of the independent claims. Advantageous further embodiments are the subject matter of the dependent claims.

According to the invention, a method for closed-loop control of the electrode gap in a vacuum arc furnace is provided, wherein an electrode gap of a melting electrode from the surface of a melt material is subjected to closed-loop control as a function of a droplet short-circuit rate. In the context of the method, a histogram of detected droplet short-circuits is created on the basis of at least one droplet short-circuit criterion, the histogram is subdivided into sub-areas, a characteristic sub-area is selected for closed-loop control purposes, and an electrode gap is subjected to closed-loop control on the basis of the droplet short-circuits which can be associated with the selected sub-area.

Droplet short-circuits can, for instance, be detected by means of high-precision current/voltage measurements and be represented in a histogram. The histogram subdivides the type of the occurring droplet short-circuits with respect to at least one droplet short-circuit criterion and represents a frequency of occurrence distribution with regard to said short-circuit criterion. The histogram is subdivided into several sub-areas, which can have an equal gap, but also a variable width, in particular, at least two sub-areas can be interpreted. After an analysis of the frequency of occurrence distribution, in these sub-areas, a characteristic sub-area of the histogram can be selected for closed-loop control purposes, and, at least in some phases, the electrode gap can be subjected to closed-loop control on the basis of the droplet short-circuits which can be associated with said selected sub-area. Thus, a closed-loop control of the electrode gap is not performed non-specifically on the basis of all occurring droplet short-circuits, but the droplet short-circuits are categorized, at least represented in a histogram with respect to one criterion and only a sub-area of the droplet short-circuits, which represents a fraction of the occurring short-circuits with regard to said one or more criteria, is selected, and the closed-loop control is performed on the basis of said subset of the occurring droplet short-circuits. In this way, a filter criterion is created and only those droplet short-circuits are used for closed-loop control which are ideally suited for a closed-loop control of the electrode gap in the corresponding remelting phase of the electrode. This can be made possible by utilizing highly-sensitive current and/or voltage measurement methods as well as fast processors, which makes a more precise detection of droplet short-circuits, in particular of short-circuits caused by small droplets, possible. A closed-loop control with respect to another sub-area, in particular with respect to small droplets, leads to a changed closed-loop control behavior in many cases, wherein quite improved remelting results can be achieved.

The selection of the sub-area and of the droplet short-circuit criterion can be performed based on empirical values, but also automatically, and can be adapted to the respective remelting phase. The histogram represents a statistical distribution of the droplet signal frequency of occurrence, which can, for instance, be subdivided into duration, form and amplitude of the droplet short-circuits. Here, short-circuits can also be recorded in areas which are located considerably below or above those of conventional closed-loop control systems for droplet short-circuits. The droplet short-circuit signals differ from the signals usually taken into account in their behavior and occurrence in specific melting situations and make an improved and faster closed-loop control possible, wherein a selection and weighting of the droplet rates in specific melting situations can be performed. In specific melting situations, droplets occur, for instance, which are significantly more frequent than those which are located in the conventional recording area. By taking into account these types of droplets which occur with noticeable frequency and by focusing the closed-loop control on the occurring droplet sub-areas, a faster reaction and an improved closed-loop control of the gap can be made possible. For instance, distinguishing between small and large droplets is possible, wherein the small droplets represent short, fast voltage drops and the thick droplets represent strong, lengthy voltage drops. The droplet frequency is represented, for instance, in a statistical distribution of the droplet rate according to small and large droplets. Here, the small droplet short-circuits can, for instance, be 5-100 times smaller than the large droplet short-circuits, wherein a precise measurement of the droplet characteristics is required in all conceivable measurement areas. So-called droplet showers also occur to be empirically detected, from which useful information on the electrode gap can be extracted. Said showers occur in irregular time intervals in each phase of the remelting process, such as once every minute, and have a high frequency, such that they have mostly been ignored by conventional methods for closed-loop control of the gap. In this connection, different types of droplets describe different physical processes, for instance, large droplets describe a remelting of a large amount of electrode material of approximately 1 $cm^3$, and a plurality of small droplets describe a continuous remelting over a longer period which is effected by a droplet shower of electrode material. Arcs generate similar voltage signatures to droplet signatures, which can be associated with a specific type of droplet. When the droplets change, in particular from large to small droplets, it is remarkable that, although the frequency of occurrence of the droplets varies in proportion to the size, a total amount of the material dropping off seems to be almost constant.

In contrast to conventional methods for closed-loop control, in which a Schmitt trigger threshold value controller with a constant threshold step is used for detecting droplet short-circuits, adaptive threshold steps and methods for closed-loop control, which can be adjusted with regard to different droplet characteristics, can be used. Here, a correlation between the occurrence of different physical processes and the occurrence of different droplet signatures can be used, which make specific signatures better usable than others for a closed-loop control of the gap, depending on the melting situation, since the physical processes corresponding in each case represent a better measure for the electrode gap. In this context, the areas of the droplet histogram examined for the closed-loop control can be selected dynamically. Multiple histogram areas can also be recorded at the same time and examined together for a closed-loop control—weighted if necessary—or additional information from the multiple areas can be determined in order to improve the closed-loop control.

According to an advantageous further embodiment, for selecting a characteristic sub-area, a weighting function, preferably as a function of the phase of the remelting process, can be applied to the different sub-areas, and, corresponding to the most strongly weighted characteristic sub-area, a predeterminable controller behavior, in particular a corresponding closed-loop control amplification and a corresponding controller behavior, can be selected, whereupon closed-loop control of the electrode gap is realized on the basis of the selected controller behavior as a function of the droplet short-circuits which can be associated with the characteristic sub-area. In this way, after selecting a characteristic sub-area, different closed-loop control parameters, in particular closed-loop control amplification, closed-loop control behavior (integral, proportional or differential closed-loop control behavior) can be associated with said sub-area. For instance, with respect to each criterion, a subdivision into different sub-areas and again, with each sub-area, a specific set of closed-loop control parameters can be associated. For instance, small high-frequency droplet short-circuits can require a faster closed-loop control behavior and, for instance, an integral controller behavior, whereas slow, large droplet short-circuits can cause a proportional closed-loop control. Thus, an improved fine-tuning of the closed-loop control behavior corresponding to the type, extent and phase of the remelting process can be achieved.

According to an advantageous further embodiment, the droplet short-circuit criterion can comprise at least an amplitude drop value, a short-circuit frequency of occurrence, a short-circuit duration, a droplet interval or an amplitude profile, wherein the criterion parameter can be subdivided into at least two sub-areas. For instance, as the droplet short-circuit criterion, the voltage drop of the DC supply voltage can be applied. Here, it can, for instance, be distinguished between a small voltage drop from 0 to 2 Volts and a large voltage drop from 2 to 10 Volts. Furthermore, the frequency of occurrence or the frequency of the droplet short-circuits can be used as a criterion and, for instance, it can be distinguished between fast droplets <0.1 ms and slow droplets in the range from 0.1 ms to 20 ms. Lastly, the short-circuit frequency of occurrence can be examined, that is the number of the droplet short-circuits occurring in a predeterminable period of time, in particular a period of time which can be significantly shorter than a specific phase of the remelting process. Correlating with the short-circuit frequency of occurrence, the interval between droplets or the interval of droplets of a short-circuit criterion in contrast to droplets of another short-circuit criterion can be used, for instance the frequency of occurrence between short and lengthy droplet short-circuits. Lastly, by examining the form of the voltage and/or current drop, the amplitude profile of the short-circuit can be characterized and it can be distinguished between sharp, steep-edge short-circuits and slowly ascending or slowly descending short-circuits. In this way, a multidimensional histogram can be created, in which two-dimensional or multidimensional droplet short-circuit areas can be selected as characteristic criterion areas. The histogram can be displayed graphically—multidimensionally if necessary—and can provide an important indication regarding the electrode gap as well as the quality of the remelting process to a user.

According to an advantageous further embodiment of the invention, the histogram can at least represent two droplet short-circuit criteria, such that a sub-area is a two-dimensional or multidimensional sub-area. Thus, the histogram can take into account more than a single short-circuit criterion, for instance two or more criteria, and can represent a multidimensional selection field for selecting a droplet short-circuit criterion. In this way, for instance, the amplitude drop value, the short-circuit frequency of occurrence as well as the short-circuit duration can be used as a criterion and it can be distinguished between strong and weak short-circuits, lengthy and short short-circuits as well as a large number and a small number of short-circuits, on the basis of which at least eight different closed-loop control areas for closed-loop control of the electrode gap can thus be used. A characteristic sub-area can, for instance, be fixed in advance by means of empirical values in the course of a remelting process, or be selected by means of significance criteria, for instance an increased number of occurring short-circuits in a sub-area or an occurrence of significant short-circuits corresponding to an examined criterion. Here, a single characteristic sub-area can be fixed prior the beginning or when the first droplet short-circuits occur, and said sub-area can be examined during the entire remelting process. A two-dimensional short-circuit criterion can be displayed very easily in a quasi-three-dimensional way and shows information on the quality and phase of the remelting process which is easy to comprehend and is complex.

According to an advantageous further embodiment, however, a characteristic sub-area can be newly selected at the beginning or in predeterminable phases of the remelting process, wherein preferably, a closed-loop control based on sub-areas is performed only in specific phases of the remelting process. For instance, when the electrode is positioned closer to the melting crucible, initially, a closed-loop control based on droplet short-circuits cannot be realized, whereas after the beginning of the remelting process, a closed-loop control of the short-circuits based on large droplets and after, for instance, an initial phase of the remelting process, a redirection with respect to high-frequency droplets or other characteristics can be realized. In this context, new sub-areas can be selected in each case corresponding to the occurring significance of the individual droplet short-circuit rates.

The histogram of the recorded droplet short-circuits forms the basis for the method for closed-loop control and can, according to an advantageous further embodiment, be repeated during at least one phase of the remelting process, in particular continuously be newly created, wherein a characteristic sub-area, at least in the case of a deviation of the sub-areas of the newly created histogram with respect to the previous histogram, which can be preset, can be newly selected. For instance, the histogram can be specified for the first phase of the remelting process and a subdivision of the occurring short-circuits into a histogram can be realized. If other types of short-circuits increasingly occur, the subdivision of the histogram or the number of the criteria taken into account in the histogram can be adapted and a new, different histogram can be created, on the basis of which a further closed-loop control will be realized. This can be realized at least within one phase of the remelting process, in particular, however, it can be checked continuously whether the previous histogram subdivision and the structure of the characteristics of the histogram represent the existing remelting process in an ideal way or whether new criteria are to be taken into account.

If a voltage amplitude drop value is used as a droplet short-circuit criterion, it can be advantageous to record the voltage amplitude drop value in a range from 1 mV to 15 Volts, preferably 5 mV to 6 Volts, in particular 1 Volt to 3 Volts. Large voltage amplitude drop values >2 Volts indicate the loosening of a large amount of electrode material or the formation of a short-circuit bridge. Very small drops in the range of below 3 V, often below 1 V and in some cases <5 mV, indicate falling electrode droplets, which should preferably be used for a closed-loop control of an electrode gap in the middle of the remelting phase. By selecting a voltage amplitude drop value area as large as possible, a closed-loop control can be realized very precisely on the basis of the voltage drops and the histogram can be subdivided into at least two, in particular multiple, sub-areas. The short-circuit duration can also be used as the droplet short-circuit criterion.

According to an advantageous further embodiment, it makes sense to record the short-circuit duration in the range from 0.3 µs to 300 ms, preferably 3 µs to 30 ms, in particular 10 µs to 70 µs. By recording in particular short short-circuit durations in the microsecond to millisecond range, a highly precise closed-loop control of the electrode gap can be realized by examining ultra-short droplet short-circuits, wherein in all phases of the remelting process, an increased precision of the closed-loop control of the electrode gap can be achieved. Thus, a droplet type characterization as well as a measurement isolation of a rate of "small droplets" is advantageous in almost all melting phases.

As a potential droplet short-circuit criterion, an amplitude profile of the droplet short-circuits can be examined, which can, for instance, be deduced from the chronological sequence of the voltage and/or current drop when a short-circuit occurs. In this context, it is advantageous to describe the amplitude profile by a multi-scale diagram, in particular by a wavelet transform of the droplet short-circuit signal, wherein the multi-scale diagram can be used as an amplitude profile criterion. A multi-scale analysis is an approximation of a form by means of a discrete wavelet description, in which scaling functions which are orthogonal relative to each other can be used for an approximation of an analytical function. By taking into account any number of scaling functions, a continuously improved representation can be achieved, wherein an analytical function can be approximated by a finite amount of scaling functions. The generated error is reduced globally by adding further scaling functions at finer scales. The description of the amplitude profile by the multi-scale diagram makes a digital representation of the amplitude profile possible which is compact, fast to create and fast to compare, such that a simple closed-loop control on the basis of the occurring amplitude profile characteristics is possible.

A remelting process usually proceeds in an environment which is heavily susceptible to failures with respect to the supply network, in which many high-current consumers cause drops in the supply voltage network and in which the network supply voltage is heavily impurified by failures of surrounding electricity consumers. Starting from the supply network voltage with many failures, this also affects the remelting voltage and thus, the detection of the droplet short-circuits on the basis of the remelting voltage or the remelting current. By means of suitable filtering measures, the failures of the network can be filtered out, such that, when detecting the droplet signal, the supply network failures can be taken into account, in order to achieve a short-circuit droplet signal which is improved in quality. By means of this proposal for improvement, failures on the part of the network can be filtered out of the droplet signal, for instance by means of a network failure filter, for instance periodically occurring failures can be filtered out by means of digital or analogue measures, such that only failures caused by droplet short-circuits in the supply voltage or the occurring electrode current have to be analyzed with respect to the occurrence of droplet short-circuits. In this way, a more precise detection of the droplet short-circuits and thus, an improved closed-loop control can be achieved. For instance, a filter on the basis of a phase correlation of network failures relative to the network period can be used in order to filter out periodically occurring failures.

In a side aspect, the invention provides a device for closed-loop control of the electrode gap in a vacuum arc furnace, comprising a droplet short-circuit detection device for detecting droplet short-circuits and an electrode gap closed-loop control device for closed-loop control of the electrode gap of a melting electrode from the surface of a melt material, wherein the closed-loop control device subjects the electrode gap to closed-loop control as a function of the detected droplet short-circuits. The device further comprises a droplet short-circuit histogram device for distributing the short-circuits according to at least one predefinable droplet short-circuit criterion in a histogram, and a sub-area selection device for selecting a characteristic sub-area from the droplet short-circuit histogram, wherein the closed-loop control device can perform a closed-loop control with regard to the droplet short-circuits which can be associated with the characteristic sub-area. Thus, the invention starts from a device for closed-loop control which is known in principle, and which subjects the electrode gap to closed-loop control on the basis of detected droplet short-circuits. A droplet short-circuit histogram device subdivides the droplet short-circuits according to predeterminable or freely selectable droplet short-circuit criteria and distributes them in a one-dimensional or multidimensional histogram corresponding to the criteria, wherein each criterion can be subdivided into at least two sub-areas. For the closed-loop control of the electrode gap, a sub-area selection device selects a sub-area of the histogram, wherein the device for closed-loop control carries out a closed-loop control on the basis of the selected sub-area. The device for closed-loop control according to the invention is suitable for carrying out a method according to any one of the above-mentioned embodiments and represents the occurring short-circuits in a histogram, wherein the electrode gap can be subjected to closed-loop control on the basis of a sub-area of the histogram. In principle, an existing device for closed-loop control can be expanded or retrofitted into a device for closed-loop control according to the invention by adding a histogram device and a selection device.

According to an advantageous further embodiment of the device for closed-loop control, the sub-area selection device can comprise a sub-area definition unit for defining droplet short-circuit sub-areas of the histogram and a weighting function unit for weighting the sub-areas of the histogram, such that a most-strongly weighted sub-area can be selected as a characteristic sub-area. The sub-area selection device thus comprises a sub-area definition unit, which is able to subdivide the respective criterion into sub-areas, wherein this subdivision can be selected differently, depending on the remelting phase. Furthermore, a weighting function unit is able to weight the individual sub-areas, such that, for instance, in specific remelting phases or at the beginning or end of the remelting process, different characteristics can be weighted more strongly than others, such that a closed-loop control can increasingly be performed with respect to said sub-areas and criteria. By adding a variable definition unit and a weighting function unit to the selection device, an improved precision of the method for closed-loop control can be achieved.

In principle, the controller can carry out a closed-loop control with constant closed-loop control parameters and characteristics on the basis of the selected histogram sub-area. A P, an I, a D, a PI, a PT, a PID or any other kind of controller is suited, with which the following amplification factors for closed-loop control can be fixed: proportional term, response times, differential and integral behavior. According to an outstanding embodiment, the device can comprise a closed-loop control parameter selection device, which selects a set of closed-loop control parameters, in particular closed-loop control amplification and closed-loop control behavior, on the basis of the characteristic sub-area, and can attribute said parameters to the device for closed-loop control. Thus, a set of closed-loop control parameters and closed-loop control behaviors can be associated with each sub-area of a histogram, for instance in a dynamic or fixed manner, and, when said sub-area is selected as a characteristic sub-area for closed-loop control, the controller can be set with parameters for closed-loop control which are predetermined or can be selected, such that different closed-loop control behaviors on the basis of different droplet short-circuits can be used. For instance, with a closed-loop control on the basis of short, fast droplets, a high P ratio and a low integral ratio can be selected, whereas on the basis of slow, large droplet short-circuits, a low P-ratio and a high I-ratio of the closed-loop control behavior can be taken as a basis. In this way, in particular when a changed histogram sub-area is selected, a different closed-loop control behavior can be set, such that an improved closed-loop control in different remelting phases can be achieved.

The network supply in a remelting operation is often susceptible to failures and exposed to the influences of surrounding high-current and quickly switching electricity consumers. Said failures even affect the direct current supply of the electrode voltage and of the occurring electrode currents. For an improved droplet short-circuit detection, the device can advantageously comprise a network voltage filter unit, which can suppress occurring failures of the supply network with the droplet short-circuit detection. Said network voltage filter unit can, for instance, determine the network voltage and the occurring network currents of the surrounding consumers, and subtract them out of the droplet short-circuit signal, or eliminate periodically occurring failures, since those are not statistically irregularly distributed like the occurring droplet short-circuit currents. By filtering network failures out, an improved and more precise detection of actual droplet short-circuits can be determined and in this way, an increased quality of the electrode gap can be achieved.

In principle, it is conceivable to inertially carry out the adaptive method for closed-loop control according to the invention one or more times in a remelting process, in particular when remelting new materials or when bringing into service changed device parts, to keep record of the selected closed-loop control behavior and, in further remelting processes, to use the recorded closed-loop control behavior in the context of a deterministic, "rigid" closed-loop control sequence. In this way, the method according to the invention can be carried out as a "teach in" for the setting of a rigid closed-loop control sequence, whereby an ideal controller behavior can be found, such that, furtheron, a rigid closed-loop control program guarantees deterministically achievable quality features of the remelt product.

Further advantages of the present invention result from the present drawing description. In the drawing, embodiments of the inventions are shown. The drawing, the description and the claims comprise many features in combination. The person skilled in the art will expediently also put the individual features together for further reasonable combinations.

IN THE DRAWINGS

FIG. 1 schematically shows a vacuum arc furnace;

FIG. 5 shows droplet short-circuit signals at different time scales;

In the figures, equal or similar components have the same reference numerals.

Figure 1:
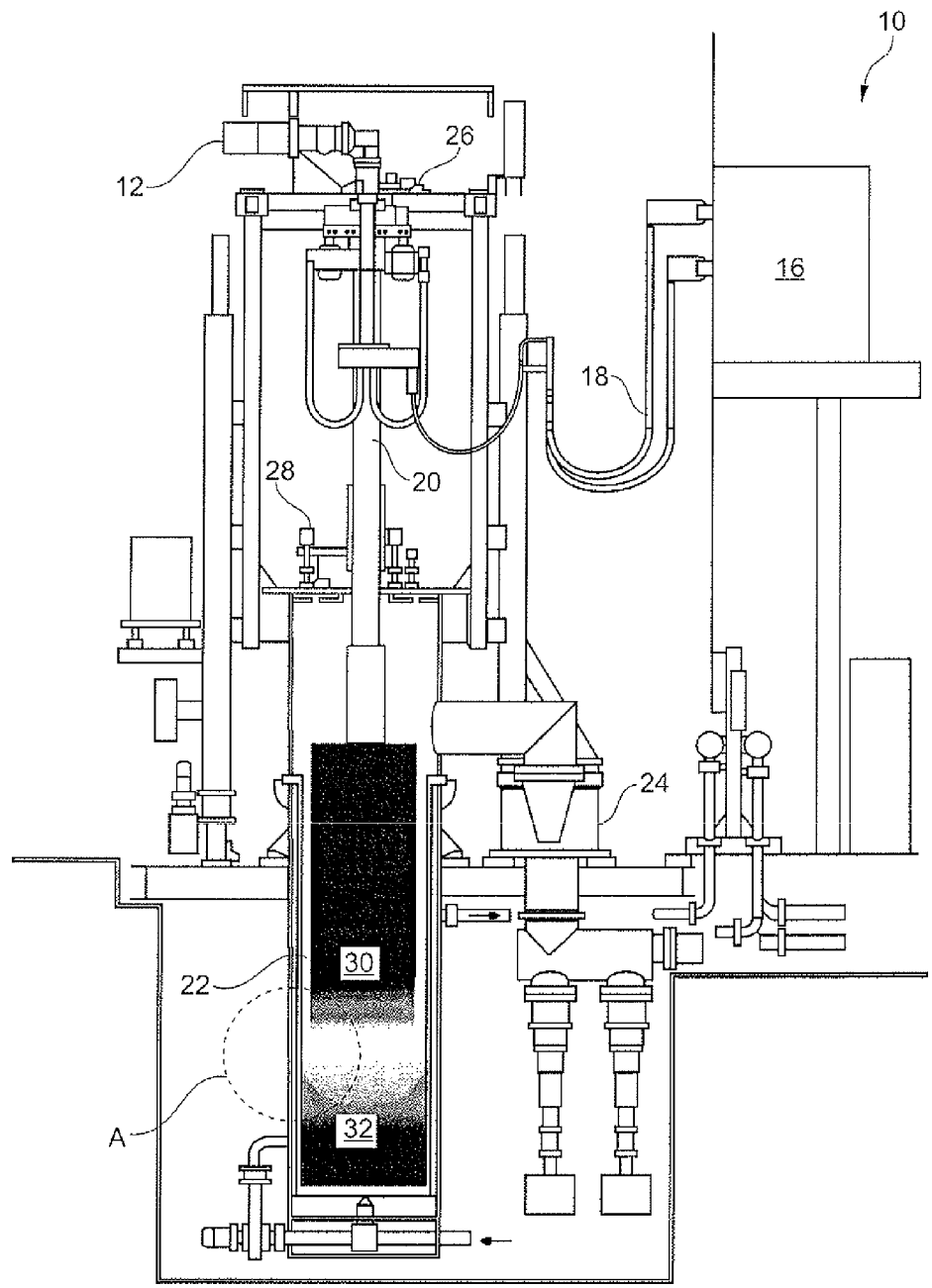

FIG. 1 schematically shows a design of a vacuum arc furnace 10. The arc furnace 10 essentially comprises a water-cooled furnace chamber 22, in which a melt material 32 is received. An electrode 30 which is variable in height can be vertically dipped into the melt material or be pulled upward by means of an electrode feed bar 20 and an electrode drive device 12. By means of an X-Y-orientation device 26, the horizontal position of the electrode 30 can be adjusted in the water-cooled furnace chamber 22. A sensor device 28 can determine the horizontal and the vertical electrode position, as well as record a drive speed. The water-cooled furnace chamber 22 is placed under a vacuum or a low pressure by means of a vacuum generation device 24, such that the melting-off of the electrode material into the melt material 32 can be realized without atmospheric impurities by a surrounding atmosphere. The electrode is supplied with power by a power supply device 16 by means of power supply lines 18, wherein, at the electrode end, power is transmitted into the melt material 32 by spark generation, and flows back to the power supply device 16 from there. A device for closed-loop control of an electrode gap subjects the vertical feed speed and the position of the drive device 12 to closed-loop control such that a melting process, as homogeneous as possible, can be carried out. Prerequisite for a closed-loop control based on droplet short-circuits is a reliable detection of droplet short-circuits. The pulse-like short-circuits overlapped by the arc voltage can be separated from the supply electrode voltage via a filter and trigger combination.

Figure 3:
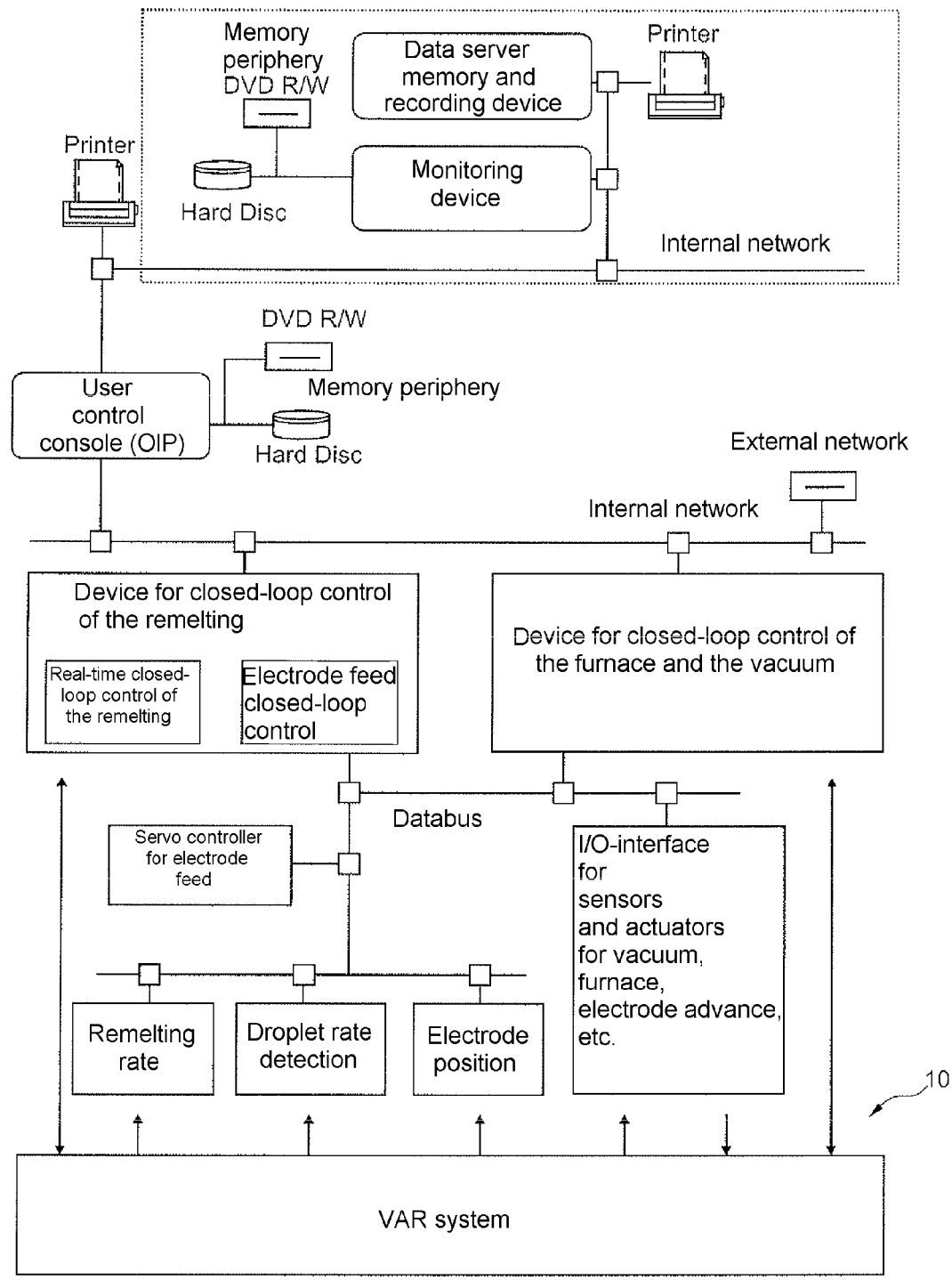
FIG. 3 shows a device for gap closed-loop control of an arc from the state of the art.

FIG. 3 shows a device for closed-loop control of an electrode gap known from the state of the art, with which the vacuum arc furnace illustrated in FIG. 1 is connected to the device for closed-loop control via a sensor and actuator mimic. By means of sensors, such as current and/or voltage measuring instruments, mechanical displacement sensors etc., a remelting rate, a droplet rate detection and an electrode position are recorded and are transmitted to a servo controller for the electrode feed via a data BUS. These data are furthermore transmitted to a remelting closed-loop control device, which carries out a closed-loop control for the electrode feed as well as a real-time closed-loop control of the remelting and, for instance, a closed-loop control of the cooling of the furnace chamber 22. Lastly, the data are transmitted to a device for closed-loop control of the furnace and the vacuum, which controls, for instance, furnace temperature, vacuum and other influencing parameters in the remelting process. In addition, via an I/O-interface, the data BUS receives and transmits control data to actuators for maintaining the vacuum, the furnace temperature, the electrode advance and further setting parameters for the vacuum arc remelting process. Via an internal network, the device for closed-loop control of the remelting and the device for closed-loop control of the furnace and the vacuum are connected to a user control console, which comprises a memory periphery, a data server and a recording device and a monitoring device for monitoring the remelting process, by means of which a user in an internal or external network, for instance remote, can be informed of the state of the remelting process, it can be kept record of the parameters and further parameters can be adapted by the system.

Figure 2:
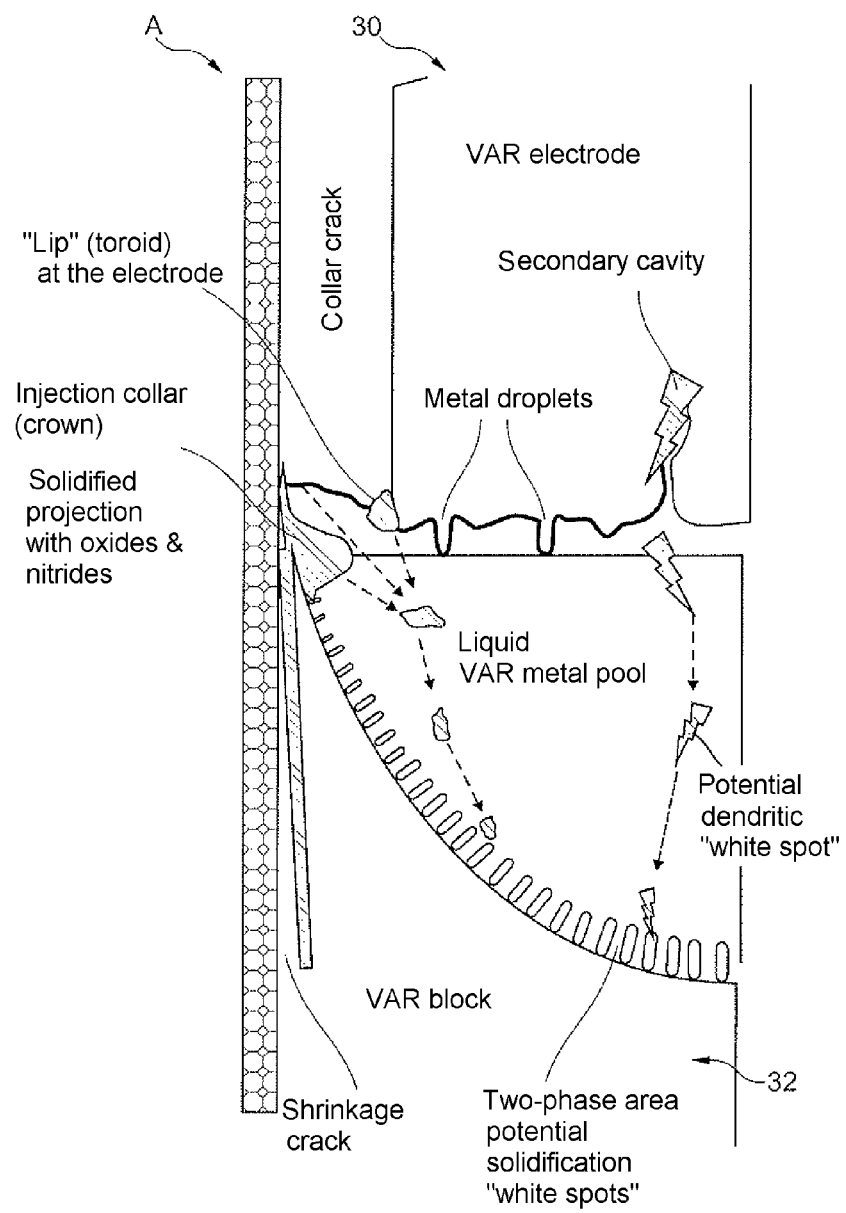
FIG. 2 shows occurring errors with the vacuum arc remelting process.

In the FIG. 2, typical material defects which can occur with the remelting process are illustrated. In FIG. 2, an electrode end of an electrode 30 is illustrated which is liquefied by means of arc formation relative to the melt material 32, wherein individual material droplets fall down into the melt material and thus, a remelting process of the electrode material is carried out. Here, secondary cavities within the electrode are also remelted and the foreign materials contained therein are transferred into the melt material. At the outer edge of the electrode end, a so-called lip or toroid is formed, with which there is the danger that parts may come off and potential discrete white spots may be produced. Furthermore, at the outer edge of the melt material opposite to the furnace wall, an injection collar, which is referred to as a crown, is formed, wherein a danger of a short-circuit in the case of imprecise electrode guiding between the electrode and the injection collar arises. Said injection collar includes fixed oxides and nitrides. When the melt material is cooled, a shrinkage crack with respect to the furnace chamber is formed, such that the solidified melt material can easily be removed from the furnace chamber. During the solidification process, in a two-phase area of the liquid melt material, white spots can be formed, which can have a dendritic nature. An imprecise electrode guiding promotes the formation of such white spots, the lip at the electrode can be enlarged and the injection collar of the melt material can cause dangerous short-circuits and material ruptures. For this reason, a high-precision closed-loop control of the electrode gap is required.

Figure 4A:
FIG. 4 shows voltage signals with occurring droplet short-circuits.
Figure 4B:
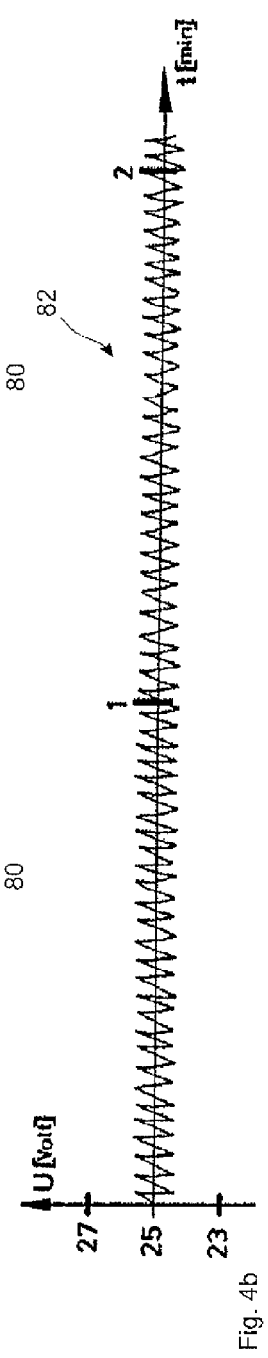
Figure 4C:
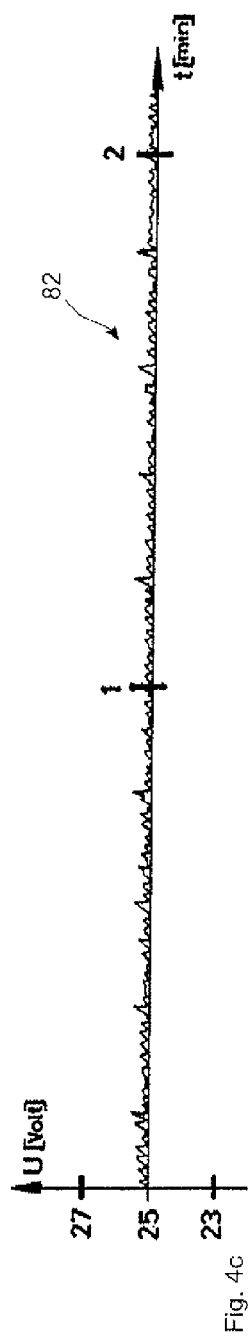

FIG. 4 shows typical voltage sequences of the electrode voltage in the course of a remelting process during a period of two minutes. In the diagram 4a, a large amount of smaller, regularly occurring droplet short-circuits are illustrated, wherein individual large droplet short-circuit signals 80 indicate large electrode pieces falling down. FIG. 4b shows the result of a high-precision closed-loop control of the electrode gap, with which medium-size droplets fall into the melt material from the electrode and a homogeneous distribution of the electrode short-circuits occurs. In FIG. 4c, an amount of very small droplet short-circuits can be detected, as to be expected with a very small gap between the electrode and the surface of the melt material. However, there are no lengthy, high short-circuits, such that an exact closed-loop control of the electrode gap can be suggested and a homogeneous remelting process is indicated.

In FIG. 5, an electrode signal which suffers from heavy failures is illustrated, with which a large number of different short-circuits, in particular intense droplet short-circuits 80, occurs, which indicate large material pieces of the electrode falling down. FIG. 5b illustrates a section A of the droplet short-circuit signal 82 illustrated in FIG. 5a, wherein, apart from the significant droplet short-circuit amplitudes, a large number of small droplet short-circuits occurs, such that a closed-loop control with respect to said small droplet short-circuits makes a substantially more precise closed-loop control of the electrode gap possible.

Figure 6:
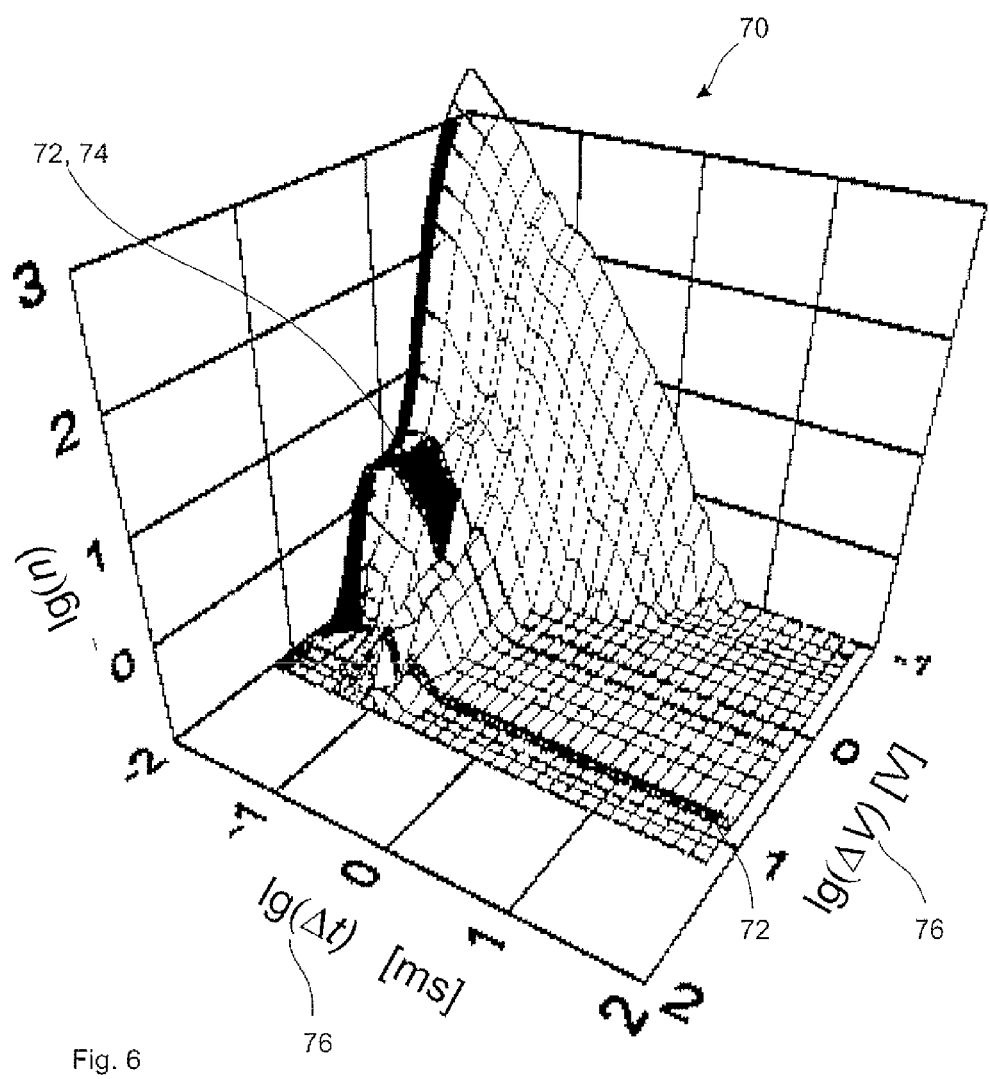
FIG. 6 shows a histogram of occurring short-circuits.

In FIG. 6, a histogram of occurring droplet short-circuits according to two droplet short-circuit criteria, on the one hand, an amplitude drop vale $\Delta V$, on the other hand, a short-circuit duration $\Delta t$, is illustrated in logarithmic scaling. In the z-direction, the number of droplet short-circuits n is recorded. Here, two characteristic sub-areas 72 are marked in black, wherein in one sub-area 72, with a constant amplitude drop value, only a small amount of characteristic droplet short-circuits can be recorded. In a two-dimensional characteristic sub-area 72 of small amplitude drop values and in the range of very short droplet short-circuit durations, that is small, high-frequency droplet short-circuits, a significant surface of the droplet short-circuits can be seen, which is exceptionally well-suited for the closed-loop control of the electrode gap due to its homogeneous distribution. A closed-loop control can take such a form that it is tried to keep the amount of droplet short-circuits occurring in said sub-area as constant as possible. In this way, a homogeneous remelting process can be ensured. The histogram can easily be illustrated for a user by means of different graphic options and can be used for recording the remelting process and for quality control.

Figure 7:
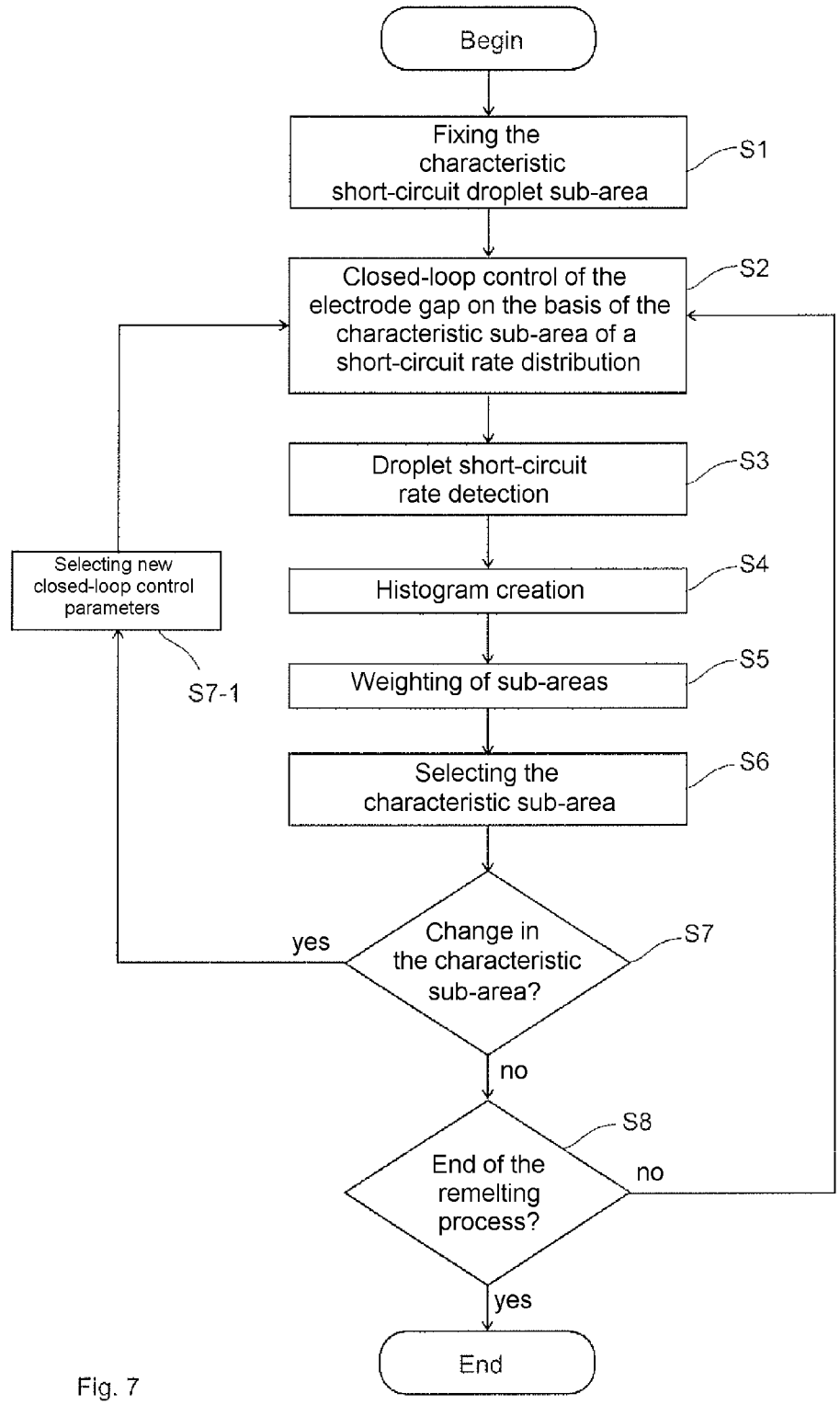
FIG. 7 shows a flow chart of a method for closed-loop control of an electrode gap according to the invention.

In FIG. 7, an embodiment of a method for closed-loop control of an electrode gap according to the invention is schematically illustrated. Here, in step S1, a characteristic droplet short-circuit sub-area is fixed and thus, the droplet short-circuit criterion to be taken into account and the sub-area to be examined are defined. In step S2, a closed-loop control of an electrode gap on the basis of the characteristic sub-area of the short-circuit rate distribution is performed, with which it is tried to keep the short-circuits occurring in said sub-area constant or to maintain them corresponding to a specified short-circuit criterion. An increase or decrease of the short-circuits in said sub-area can result in the electrode gap being enlarged or made smaller. In the context of the closed-loop control of the electrode gap, in step S3, droplet short-circuits are detected and a histogram is created in step S4. Said histogram can be newly created continuously or in particular intervals, wherein in step S5, a weighting of sub-areas of the histogram is performed, which, for instance, can be a function of the remelting phase, the electrode length or the current or electrode voltage used. Process parameters such as the type of the material, the furnace temperature or other external parameters can also be taken into account. After the histogram is weighted, a characteristic sub-area is selected in step S6, and it is compared in step S7 whether the characteristic sub-area has changed. If this is the case, in step S7-1, new closed-loop control parameters can be selected for the electrode gap controller in step S2. If this is not the case, it is checked if the melting process is finished and if not, in step S2, the electrode gap is further continued on the basis of the previous sub-area. If the electrode remelting process is finished, the process is stopped and the melted electrode is drawn back from the furnace chamber.

Figure 8:
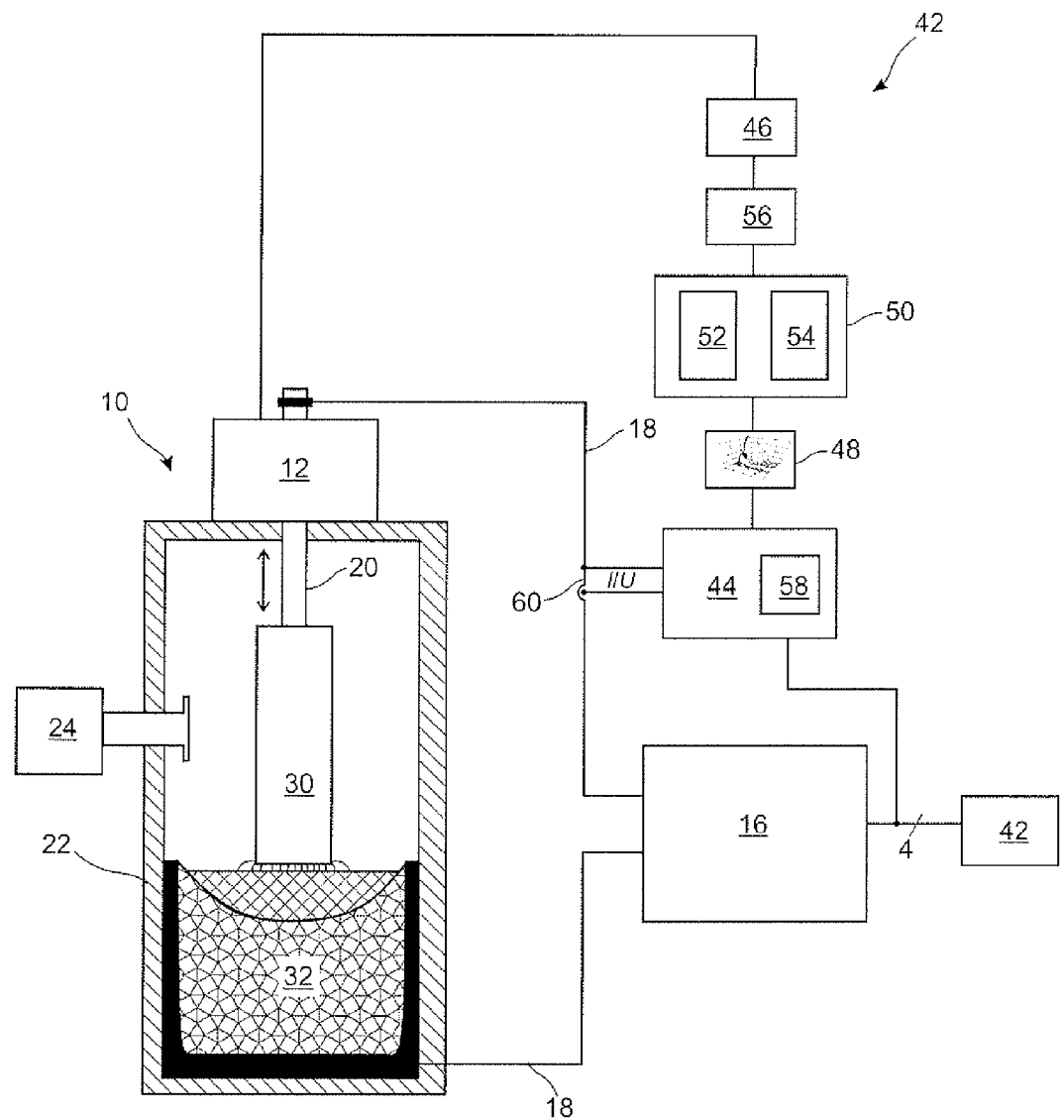
FIG. 8 shows an embodiment of a device for closed-loop control of an electrode gap according to the invention.

Lastly, FIG. 8 shows an embodiment of a device for closed-loop control of the invention. Terminals of the power supply line 18 of the environment power supply device 16 are connected at the lower area of the furnace chamber 22 as well as at the electrode 30 near the electrode drive device 12. The remelting power supply device 16 generates electricity which amounts to several thousand Amperes for remelting the electrode 30 into the melt material 32, wherein the vacuum generation device 34 maintains a vacuum or a low pressure atmosphere within the furnace chamber 22. The electrode drive device 12 moves the feed bar 20 with the attached electrode 30 in a vertical direction, such that a gap to the surface of the melt material 32 is maintained as steady as possible, in order to achieve a homogeneous remelting of the electrode material. For determining the electrode gap, the applied voltage of the electrode 30 is observed by means of a droplet short-circuit sensor 60, in this case a voltage measuring device, wherein voltage drops are examined as droplet short-circuits, which are recognized by means of a droplet short-circuit detection device 44. The droplet short-circuit rate detection device 44 comprises a network voltage filter unit 58, which observes the supply voltage provided by a supply network 42 and filters failures of the supply voltage out of the recorded signals of the power supply lines 18. From the filtered power or voltage signals, the droplet short-circuits can be detected very precisely and be represented in a droplet short-circuit histogram device 48 in a histogram. On the basis of the distribution of the droplet short-circuits, corresponding to one or more droplet short-circuit characteristics, sub-areas of the histogram, which have previously been defined by means of the sub-area definition unit 52, can be weighted by means of sub-area selection device 50, which comprises a sub-area definition unit 52 and a weighting function 54. On the basis of the weighted sub-areas, a closed-loop control parameter selection device 56 selects closed-loop control parameters, such as linear amplification P, integration constant I or dead time T, of a device for closed-loop control 46 and attributes said parameters to the device for closed-loop control 46. The device for closed-loop control 46 subjects the drive device 12 in such a manner to closed-loop control that the occurrence of the droplet short-circuits in the characteristic sub-area can be constant or be adapted corresponding to a pre-selectable set value. In this way, an improved closed-loop control of the gap of the electrode 30 from the surface of the melt material 32 can be achieved.

The invention has the aim to subject a droplet signal rate, that is melting voltage fluctuations, which can be examined by liquid metal droplets falling down from the electrode, to closed-loop control in such a manner that different droplet short-circuit signals can be examined and be used for a closed-loop control of an electrode gap, depending on their suitability. From the state of the art, droplet signals are recorded by means of a Schmitt trigger, which performs a constant threshold value recording and a closed-loop control on the basis of static criteria, independent from different measuring ranges and droplet short-circuit characteristics. For instance, the conventional electrode gap controller can only measure how often a melting voltage drops by a specific value, wherein usually, large ranges of 4 to 10 Volts are examined. In specific melting situations, especially with large melting currents, droplets occur which are ranged in an expanded measurement range, which is not taken into account by a conventional recording range.

The invention represents a statistical distribution of the frequency of occurrence of the droplet signal with respect to, for instance, duration, form and amplitude, and creates a histogram thereof, in which the one or more suitable areas are selected, on the basis of which a closed-loop control of the electrode gap is realized. Here, a weighting function can weight the individual areas of the histogram in a different manner, wherein said weighting function can be a function of the melting situation and the type of histogram. In this respect, droplet short-circuit information which was previously inaccessible and not taken into account, such as time intervals of 1 to 10 µs or voltage drops of 10 mV to 4 Volts can be examined. The droplet short-circuit signals differ significantly in particular melting situations, depending on the melting materials or a vacuum or the temperature ranges, wherein droplet short-circuit signals which were previously not taken into account make an improved and faster closed-loop control possible. By selecting and weighting the different droplet short-circuit rates corresponding to sub-areas of the histogram and while taking into account fast and short signals, in particular melting situations, an improved closed-loop control of the electrode gap can be achieved.

The invention claimed is:

1. A method for closed-loop control of an electrode gap in a vacuum arc furnace, wherein the electrode gap of a melting electrode from a surface of a melt material is subjected to closed-loop control as a function of a droplet short-circuit rate, said method comprising:
   detecting droplet short-circuits;
   creating a histogram of detected droplet short-circuits on the basis of at least one droplet short-circuit criterion, the histogram is subdivided into sub-areas;
   selecting a characteristic sub-area of the histogram for closed-loop control purposes; and
   subjecting the electrode gap to closed-loop control on the basis of the droplet short-circuits associated with the selected sub-area.

2. The method according to claim 1, in which for selecting the characteristic sub-area, a weighting function is applied to the sub-areas, and, the selected characteristic sub-area corresponding to a most strongly weighted characteristic sub-area, and a corresponding closed-loop control amplification and a corresponding controller behavior is selected, whereupon closed-loop control of the electrode gap is realized on the basis of the selected controller behavior as a function of the droplet short-circuits which is associated with the characteristic sub-area.

3. The method according to claim 1, in which the droplet short-circuit criterion includes at least one of an amplitude drop value, a short-circuit frequency of occurrence, a short-circuit duration, a droplet interval, or an amplitude profile, wherein a criterion parameter is subdivided into at least two sub-areas.

4. The method according to claim 3, in which a voltage amplitude drop value is recorded as the droplet short-circuit criterion in a range of 1 mV to 15 Volts.

5. The method according to claim 3, in which a short-circuit duration is recorded as the droplet short-circuit criterion in a range of 0.3 µs to 300 ms.

6. The method according to claim 3, in which an amplitude profile is described by a multi-scale diagram, wherein the multi-scale diagram is used as an amplitude profile criterion.

7. The method according to claim 1, in which the histogram represents at least two droplet short-circuit criteria, such that the sub-area is a two-dimensional or multidimensional sub-area.

8. The method according to claim 1, in which the characteristic sub-area is newly selected at the beginning or in predeterminable phases of the remelting process, wherein the closed-loop control based on sub-areas is performed only in specific phases of the remelting process.

9. The method according to claim 1, in which the histogram is repeated during at least one phase of the remelting process, and the characteristic sub-area, at least in the case of a deviation of the sub-areas of a newly created histogram with respect to the previous histogram, which can be preset, is newly selected.

10. The method according to claim 1, in which when detecting the droplet short-circuits, failures in a supply network are taken into account.

11. A device for closed-loop control of an electrode gap in a vacuum arc furnace, said device comprising:
- a droplet short-circuit detection device detecting droplet short-circuits; and
- an electrode gap closed-loop control device controlling the electrode gap between a melting electrode and a surface of a melt material, wherein the electrode gap closed-loop control device subjects the electrode gap to closed-loop control as a function of the detected droplet short-circuits, the electrode gap closed-loop control device including a droplet short-circuit histogram device distributing the short-circuits according to at least one predefinable droplet short-circuit criterion in a histogram, and a sub-area selection device for selecting a characteristic sub-area from the droplet short-circuit histogram, wherein the electrode gap closed-loop control device performs a closed-loop control with regard to the droplet short-circuits associated with a characteristic sub-area.

12. The device according to claim 11, in which the sub-area selection device includes a sub-area definition unit defining droplet short-circuit sub-areas of the histogram, and a weighting function unit weighting the sub-areas of the histogram, such that a most strongly weighted sub-area can be selected as the characteristic sub-area.

13. The device according to claim 11, in which a closed-loop control parameter selection device is included which selects a set of closed-loop control parameters on the basis of the characteristic sub-area, and attributes said parameters to the electrode gap closed-loop control device.

14. The device according to claim 11, in which the droplet short-circuit detection device includes a network voltage filter unit which can suppress failures in a supply network during the droplet short-circuit detection.

* * * * *